(12) United States Patent
Kielczewski et al.

(10) Patent No.: US 7,588,386 B2
(45) Date of Patent: Sep. 15, 2009

(54) LEVELING AND ALIGNING DEVICE

(75) Inventors: Grzegorz Kielczewski, Forney, TX (US); Elik Gershenzon, Daly City, CA (US); Bogdan Berlinski, San Jose, CA (US)

(73) Assignee: Silicon Valley Automation, Forney, TX (US)

( * ) Notice: Subject to any disclaimer, the term of this patent is extended or adjusted under 35 U.S.C. 154(b) by 233 days.

(21) Appl. No.: 11/468,745

(22) Filed: Aug. 30, 2006

(65) Prior Publication Data

US 2008/0056809 A1    Mar. 6, 2008

(51) Int. Cl.
*F16B 5/02*    (2006.01)
*F16M 7/00*    (2006.01)

(52) U.S. Cl. .................. 403/408.1; 403/14; 403/409.1; 248/188.4; 248/650; 411/435

(58) Field of Classification Search ............ 403/15, 403/16, 408.1, 409.1, 13, 14; 411/535, 549, 411/546, 999; 428/188.2, 188.4, 678; 248/188.2, 248/188.4, 678, 188.3, 650, 677
See application file for complete search history.

(56) References Cited

U.S. PATENT DOCUMENTS

| 843,641 | A | | 1/1907 | Fernau |
| 2,285,717 | A | * | 6/1942 | Indge ................. 411/435 |
| 2,327,050 | A | | 8/1943 | Kotler |
| 2,403,338 | A | | 7/1946 | Butler |
| 2,822,014 | A | * | 2/1958 | Cummaro |

(Continued)

FOREIGN PATENT DOCUMENTS

DE    3436166 A1 *    4/1986

(Continued)

OTHER PUBLICATIONS

Silicon Valley Automation "A Better Way to Level Your Hardware"; product catalog Jan. 2004 Relevant page—p. 1; (PDF files of the entire catalog and separately p. 1 included).

*Primary Examiner*—Daniel P Stodola
*Assistant Examiner*—Ernesto Garcia

(57) ABSTRACT

Leveling and aligning device by which the distance at which a member is supported with respect to a base may be altered and firmly locked in the given adjustment without creating stresses in either the body of the member and the base or the device by itself. The leveling and aligning device allows continuation of the adjustment process even in case of inadvertent disengagement of components of the device.

2 Claims, 3 Drawing Sheets

U.S. PATENT DOCUMENTS

| | | | |
|---|---|---|---|
| 2,883,012 A * | 4/1959 | Hoffman | 403/408.1 |
| 2,940,784 A * | 6/1960 | Fell | |
| 3,356,324 A * | 12/1967 | Attermeyer | 248/188.4 |
| 3,669,393 A | 6/1972 | Paine at al. | |
| 3,971,537 A * | 7/1976 | Winkle et al. | 248/188.4 |
| 4,061,298 A | 12/1977 | Kober | |
| 4,108,407 A * | 8/1978 | Cable et al. | 248/188.4 |
| 4,194,237 A | 3/1980 | Conkin | |
| 4,632,356 A | 12/1986 | Munz | |
| 4,682,906 A * | 7/1987 | Ruckert et al. | 403/409.1 |
| 5,013,313 A * | 5/1991 | Surer | |
| 5,066,180 A * | 11/1991 | Lang et al. | |
| 5,092,550 A | 3/1992 | Bettini | |
| 5,104,075 A | 4/1992 | Freeman | |
| 5,511,760 A * | 4/1996 | Kambara | 248/188.4 |
| 5,697,592 A * | 12/1997 | Matheny et al. | 411/535 |
| 6,024,523 A * | 2/2000 | Oudmayer | |
| 6,520,459 B2 | 2/2003 | Burr | |
| 6,669,422 B1 * | 12/2003 | Sterle | 411/535 |
| 6,725,004 B2 * | 4/2004 | Ahn et al. | |
| 2006/0169866 A1 * | 8/2006 | Vermeulen | 248/677 |

FOREIGN PATENT DOCUMENTS

| | | |
|---|---|---|
| DE | 4228625 C1 * | 3/1994 |
| GB | 812789 * | 4/1959 |
| WO | WO 85/05413 A1 * | 12/1985 |

* cited by examiner 22　21　20　19　15

LEVELING AND ALIGNING DEVICE

TECHNICAL FIELD OF INVENTION

Generally, the invention relates to devices, which adjustably support a member with respect to a base anchored to the ground, or standing on the floor, a machine or another device. This type of adjustable support is used in situations requiring precise leveling or alignment of a supported member. Typical applications would include leveling and controlling the height of tables, machines and instruments, or adjusting the vertical alignment of objects like lampposts, masts, and vertical rods. Other typical applications include alignment of assemblies such as lasers, robotic systems, and winding and reeling assemblies for films and tapes. Typically, these devices feature easy accessibility for readjustment and semi-permanent, firm locking of the member in the given adjustment.

There are many ways of creating adjustable support of a member with respect to a base, patented or not. It is common knowledge that the member should be supported at three points to minimize stresses in the material, but the most commonly used procedures to make fine adjustments are shimming and using setscrews in close proximity of three holding screws. This violates the three-point support principle since the member is now actually supported not in three, but in six points.

There are devices providing adjustable support of a member, which satisfy the requirement of three-point support. One of them is disclosed in Paine, et al U.S. Pat. No. 3,669,393. The device provides reliable results, but is bulky, cannot be hidden in the body of the member, and is difficult to adjust. In many applications, the device cannot be used at all due to limited accessibility.

Another device is described in July 2004 edition of the Silicon Valley Automation catalog entitled "A Better Way to Level Your Hardware". The PDF version of this catalog is included as an IDS. This device is known as the AFAB™ Alignment System. The devices is compact and easy to adjust. There is a significant drawback to this solution, however. If, during the adjustment process, a driving washer and an adjustment nipple lose connection, an assembler may be forced to perform a cumbersome recovery procedure. Another drawback of this solution is existence of strong stresses in the bodies of the leveling devices.

There are devices that address the problem of stresses in the body of the member and in the bodies of the leveling devices. Examples of such devices are Fernau, U.S. Pat. No. 843,641, Kotler, U.S. Pat. No. 2,327,050, Butler U.S. Pat. No. 2,403, 338 and Burr, U.S. Pat. No. 6,520,459 B2. Although these devices reduce the stresses, all of them are related to leveling of equipment that is freestanding on floors, tabletops, or top surfaces of other machines. Additionally, none of these solutions provides a means for locking the member in the given adjustment in relationship to the base, relying exclusively on gravity.

There are other devices that theoretically release the stress in the bodies of the leveling devices and at the same time allow locking the required position of the member in relationship to the base. Such devices are disclosed by Attermeyer, U.S. Pat. No. 3,356,324, Paine, U.S. Pat. No. 3,669,393, Kober, U.S. Pat. No. 4,061,298, Cable, U.S. Pat. No. 4,108, 407 and Kambara, U.S. Pat. No. 5,511,760. Practically components that are supposed to release the stress—a combination of a convex half-sphere inside a concave half-sphere of slightly larger diameter are causing even stronger stress. In theory, they have only one point of contact, which by definition generates high stress. In practice, the theoretical point of contact appears in non-existing areas of the spheres, in the areas occupied by openings for a locking screw. Instead, the components touch each other somewhere on the edge of the opening, generating a very strong stress.

BRIEF SUMMARY OF INVENTION

It is the principal object of the present invention to provide adjustable support of a member with respect to a base. The adjustable support can be easily adjusted, yet can be firmly locked in a given adjustment without stressing the material of either the base and the supported member or the adjustable support itself.

To achieve this object, the invention employs a threaded jacking sleeve, which can be threaded in and out of the body of the member. The bottom end of the jacking sleeve has a convex, spherical shape and mates with a concave, cone-shaped nest of a self-adjusting insert freely resting in a counterbore into the base surface. The insert further has a through hole in the center of the insert. Such solution gives so-called "line contact" distributing forces equally over a circle marked by the contact line between the ball and the cone. As the jacking sleeve is screwed in an out, the member rides down or up, resulting in precise setting of the required distance between the member and the base. The threaded jacking sleeve is turned by a driving washer with two protruding prongs on bottom. The driving washer has a through hole to accommodate a locking screw, and a coaxial counterbore to accommodate the head of the locking screw. The prongs engage a corresponding slot in the top of the jacking sleeve. When the jacking sleeve has been turned to achieve the desired distance between the member and the base, the adjustment can be securely locked in place by tightening a socket-head locking screw that is installed through the hole of the driving washer, the threaded jacking sleeve, the hole in the insert, and an opening in the base. The socket-head locking screw is threaded into a captive nut located in an oval groove in the base. The groove allows the captive nut to perform small x-y movements, but not to rotate. This solution effectively reduces stresses in the body of the member and in the adjustment device itself.

Although the phrase "with respect to a base" may suggest horizontal applications, devices employing the present invention can be used or placed at any angle, including up side down position, due to the ability of the device to securely lock an adjustment in place.

Another object of the present invention is to provide a solution for the problem described in the Background of the Invendon, and allow to continue the adjustment process, even if the assembler over rotates the jacking sleeve to the extent that the connection between the driving washer and the threaded jacking sleeve is lost.

To achieve this object, the ends of the prongs on the driving washer are slanted in such a way that during clockwise rotation, the prongs easily disengage from the threaded jacking sleeve's slot a fraction of a rotation earlier than they would if both sides of the prongs were of equal length and the prongs had flat ends. When the driving washer is turned counter-clockwise, the prongs engage with the threaded jacking sleeve's slot wall, allowing the threaded jacking sleeve to be turned into the body of the member. To enhance effectiveness of this feature another pair of slants could be cut on corresponding edges of the threaded jacking sleeve's slot.

Another object of the present invention is to enable the leveling device to maintain a given adjustment when subjected to vibrations.

To achieve this object, an optional spring washer is placed between the bottom of a counterbore of the driving washer and the head of the locking screw.

DETAILED DESCRIPTION OF THE PREFERRED EMBODIMENT OF THE INVENTION

Figure 1:
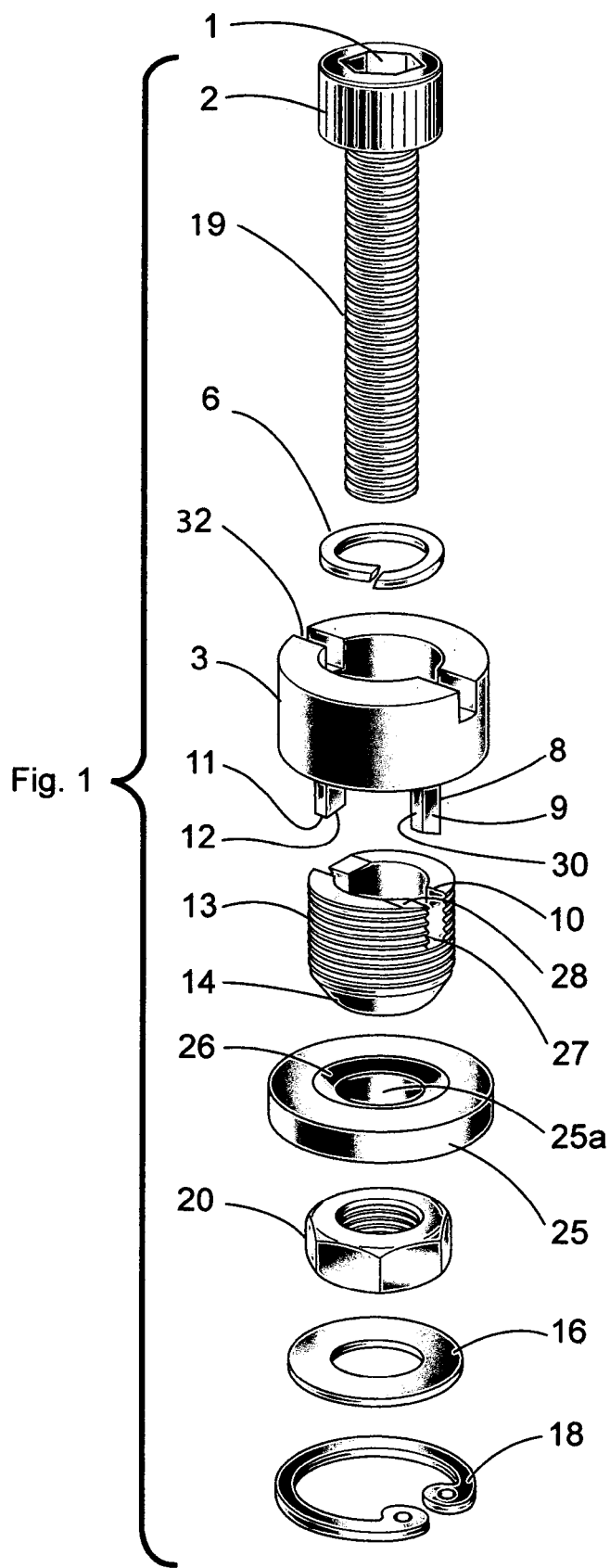
FIG. 1 is an exploded view in perspective of components of the device of the present invention other than the member, which is provided with an internally threaded opening for reception of the threaded jacking sleeve, and a counterbore for the reception of the driving washer, and the base, which is provided with a coaxial counterbore for reception of floating insert on the top and an oval groove for the reception of a captive nut and another counterbore with a groove for the reception of a washer and an internal retaining ring at the bottom.
Figure 2:
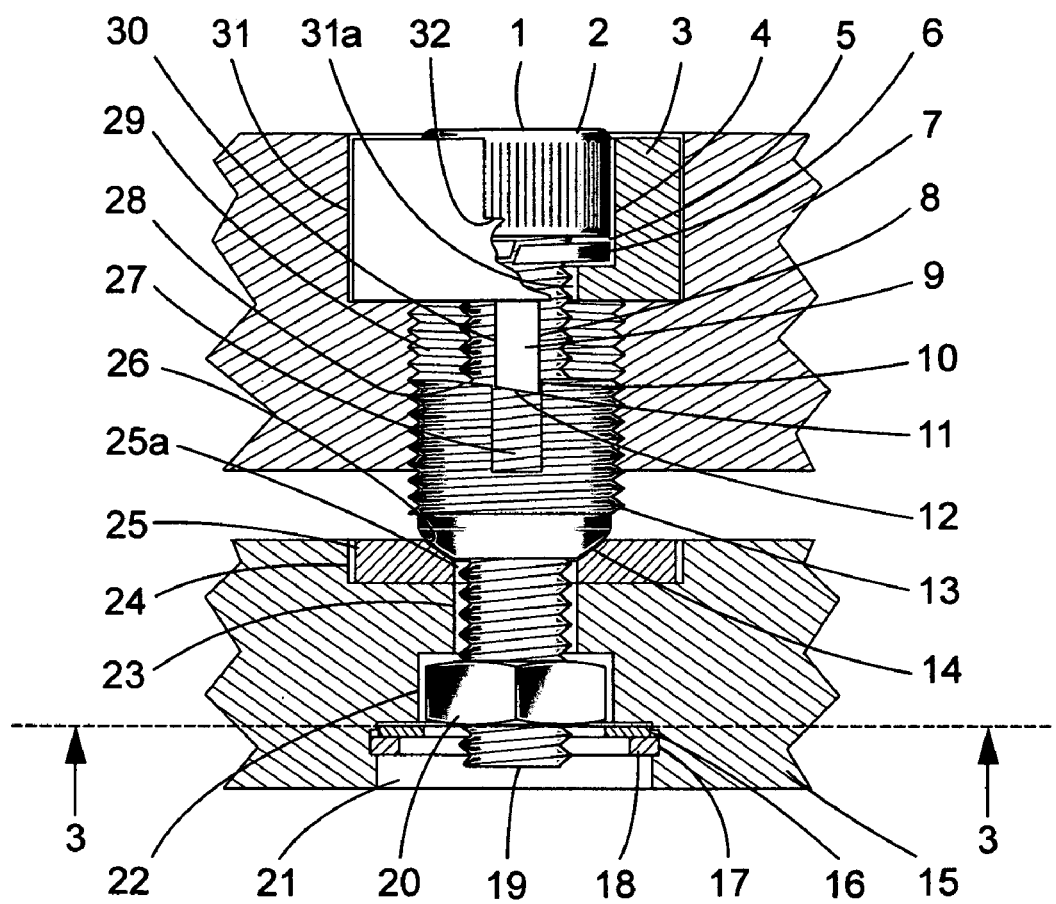
FIG. 2 is a view in side elevation of the assembled device of the present invention, in unlocked configuration, in conjunction with the member illustrated in section, the driving washer of the device shown in a partial section, and the base illustrated in section.
Figure 3:
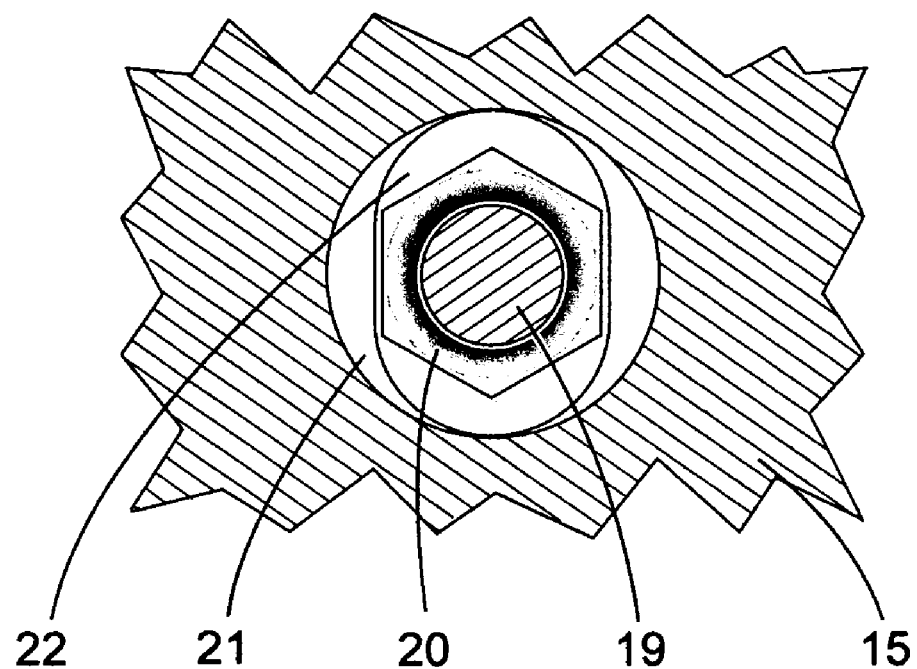
FIG. 3 is a cross sectional view taken along line 3-3 in FIG. 2.

As shown in the accompanying drawings FIG. 1, FIG. 2, and FIG. 3 the preferred embodiment of the present invention that we will refer to as "Leveling and Aligning Device" comprises base 15 having round opening 23, and a shallow counterbore 24 for reception of insert 25 on the top. The bottom of base 15 also has an oval groove 22 for reception of captive nut 20 and grooved counterbore 21 for reception of washer 16 and internal retaining ring 18. FIG. 3 is a cross sectional view taken along line 3-3 in FIG. 2 and shows how the oval groove 22 prevents captive nut 20 from rotation. Grooved counterbore 21, washer 16 and internal retaining ring 18 are an example of providing a means for loosely securing captive nut 20 in oval groove 22, and can be replaced with any means providing the same function.

Means are provided for supported member 7 to be variably positioned with respect to base 15. Member 7 is adjusted with threaded jacking sleeve 13, which has slot 27 that engages with two prongs 9 of driving washer 3. The adjustment is achieved when driving washer 3, located inside of counterbore 31 of member 7, is turned, employing prongs 9 to cause jacking sleeve 13 to turn within member 7, thus adjusting position of member 7 up or down with respect to base 15.

Optional spring washer 6 is installed loosely around locking screw 19, and is used for applications where the entire mechanical device is subjected to vibrations or heavy mechanical impacts. Spring washer 6 is positioned between the bottom of counterbore 4 and head 2 of locking screw 19.

Bottoms 12 of prongs 9 are slanted or have a ramp surface in such way that, during clockwise rotation of driving washer 3, the attacking sides 30 of prongs 9 are shorter than their opposite sides 8. Such design allows prongs 9 of driving washer 3 to disengage from the threaded jacking sleeve's slot 27 a fraction of a rotation earlier they would if the ends of the two prongs 9 were flat and parallel to top of jacking sleeve 13. The disengagement will occur providing there is sufficient gap 5 between the bottom of counterbore 4 of driving washer 3 or spring washer 6 and head 2 of screw 19. When the driving washer 3 is turned counterclockwise the sharp edges 11 of long sides 8 of prongs 9 engage with sharp edges 10 of slot 27 of threaded jacking sleeve 13 allowing threaded jacking sleeve 13 to be turned back into threaded opening 29 of the body of member 7. To enhance effectiveness of this feature another pair of slants or ramp surfaces 28 can be cut on corresponding edges of slot 27 of the threaded jacking sleeve 13.

The bottom end of threaded jacking sleeve 13 presents a convex, spherically curved surface 14 concentric with a through hole 25a, which rests in a concave, cone-shaped nest 26 of the self-adjusting insert 25.

Driving washer 3 is rotated with a special tool not shown on the drawing, which has two prongs that engage slit 32 in the body of driving washer 3.

A locking screw 19 and a captive nut 20 are provided for locking a given adjustment of member 7 with respect to base 15 with an Allen wrench inserted into an opening 1 of the locking screw 19. The locking screw 19 which is inserted into a through opening 31a of the driving washer 3, the jacking sleeve 13, the through hole 25a of the insert 25 and the opening 23 in the base 15, engages with the captive nut 20 located in oval groove 22 of base 15. The self-adjusting captive nut 20 is protected with washer 16 and held in place by internal retaining ring 18, which is snapped into groove 17 of counterbore 21.

We claim:

1. An adjustable support for supporting a member with respect to a base and allowing to adjust and semi-permanently lock a spatial relationship between the base and the member, comprising:
   A. a round driving washer with a through hole, a counterbore, a slit in a wall of the counterbore, and two prongs opposite the slit; the prongs each comprise a bottom comprising a ramp surface;
   B. an externally threaded jacking sleeve provided with a slot and having a convex, spherical end opposite an end with the slot, said slot comprising a pair of parallel walls wherein one of the walls is shorter than the other one of the walls; the jacking sleeve further comprising a ramp surface at each diametrical side of the slot and connecting with the shorter wall of the slot and engageable with the ramp surfaces of the prongs when the prongs disengage from the slot in a clockwise rotation, said prongs engageable with the slot in a counter clockwise direction;
   C. a self-adjusting round insert having a concave, cone-shaped nest on one side to accept the convex, spherical end of the threaded jacking sleeve, a through hole, and a flat round surface on the other side of the insert;
   D. a locking screw going through the through-hole of the driving washer, the jacking sleeve, the cone-shaped nest and the through hole of the self-adjusting round insert; and
   E. a captive nut engageable with the locking screw.

2. The adjustable support of claim 1 further comprising a spring washer to prevent unlocking the adjustable support in case the adjustable support is subjected to vibrations.

* * * * *